United States Patent [19]

Bolick, Jr. et al.

[11] Patent Number: 4,515,995
[45] Date of Patent: May 7, 1985

[54] TELEPHONE ANSWERING MACHINE WITH APPARATUS FOR SELECTING PARTICULAR OUTGOING MESSAGE IN RESPONSE TO INCOMING CALL ON A PARTICULAR LINE

[75] Inventors: Fred C. Bolick, Jr.; Luther C. Plunkett, Jr., both of Atlanta, Ga.

[73] Assignee: Lanier Business Products, Inc., Atlanta, Ga.

[21] Appl. No.: 290,951

[22] Filed: Aug. 3, 1981

Related U.S. Application Data

[63] Continuation-in-part of Ser. No. 78,231, Sep. 24, 1979, Pat. No. 4,319,290, which is a continuation-in-part of Ser. No. 970,357, Dec. 18, 1978, Pat. No. 4,247,876.

[51] Int. Cl.³ .............. H04M 1/64; H04M 11/10; G11B 31/00
[52] U.S. Cl. .................. 179/6.13; 179/6.06; 179/6.09; 179/6.10
[58] Field of Search ............ 179/6.03–6.17; 369/25, 29; 360/12, 92

[56] References Cited

U.S. PATENT DOCUMENTS

| | | | |
|---|---|---|---|
| 2,571,973 | 10/1951 | Walker | 360/12 |
| 2,824,907 | 2/1958 | Peterson | 179/6.05 |
| 3,589,733 | 6/1971 | Piotrowski | 274/4 |
| 3,698,722 | 10/1972 | Ban | 274/4 F |
| 3,833,186 | 9/1974 | Catto et al. | 242/201 |
| 3,904,836 | 9/1975 | Mohammadioun | 179/100.1 DA |
| 4,145,724 | 3/1979 | Medding et al. | 360/92 |
| 4,164,765 | 8/1979 | Gysling | 360/92 |
| 4,221,938 | 9/1980 | Mohammadioun et al. | 179/100.1 |
| 4,271,440 | 6/1981 | Jenkins et al. | 360/92 |

FOREIGN PATENT DOCUMENTS

| | | |
|---|---|---|
| 13806 | 6/1980 | European Pat. Off. . |
| 2009024 | 2/1970 | Fed. Rep. of Germany . |
| 2404879 | 1/1974 | Fed. Rep. of Germany . |
| 1058253 | 2/1967 | United Kingdom ............ 179/6.20 |
| 1499320 | 2/1978 | United Kingdom . |

OTHER PUBLICATIONS

EPO Search Report-corresponding APP Serial #82 106 963.0.

Primary Examiner—Raymond F. Cardillo, Jr.
Attorney, Agent, or Firm—Jones & Askew

[57] ABSTRACT

Apparatus for interfacing a plurality of telephone trunks with a record playback apparatus carrying a plurality of recording media which may be selectively engaged with a transport. The particular recording medium engaged with the transport is determined by the particular one of the plurality of trunks upon which an incoming call is received. One embodiment provides to the calling party a particular recording medium for the remote recording of dictation. A second embodiment provides a particular prerecorded message in response to the particular trunk upon which the incoming call is received and records incoming messages on a common recording medium.

5 Claims, 13 Drawing Figures

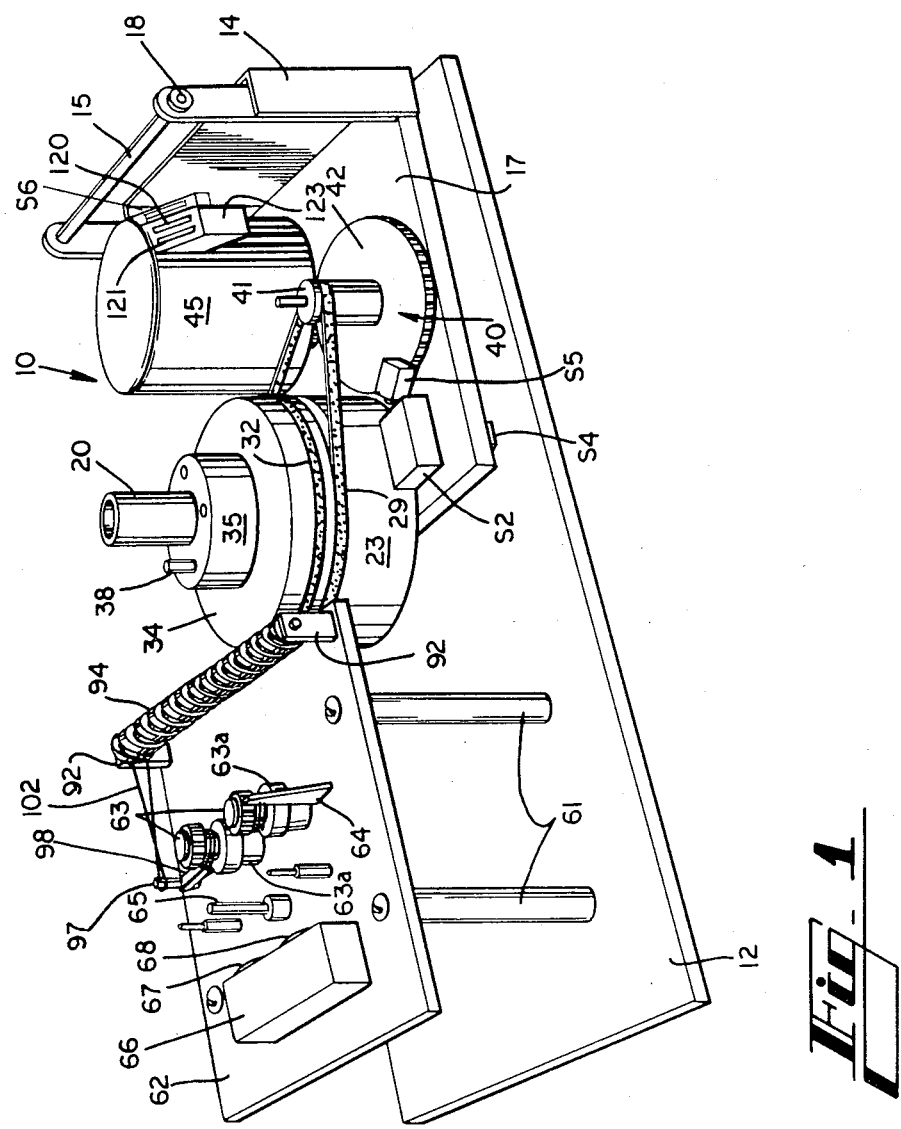

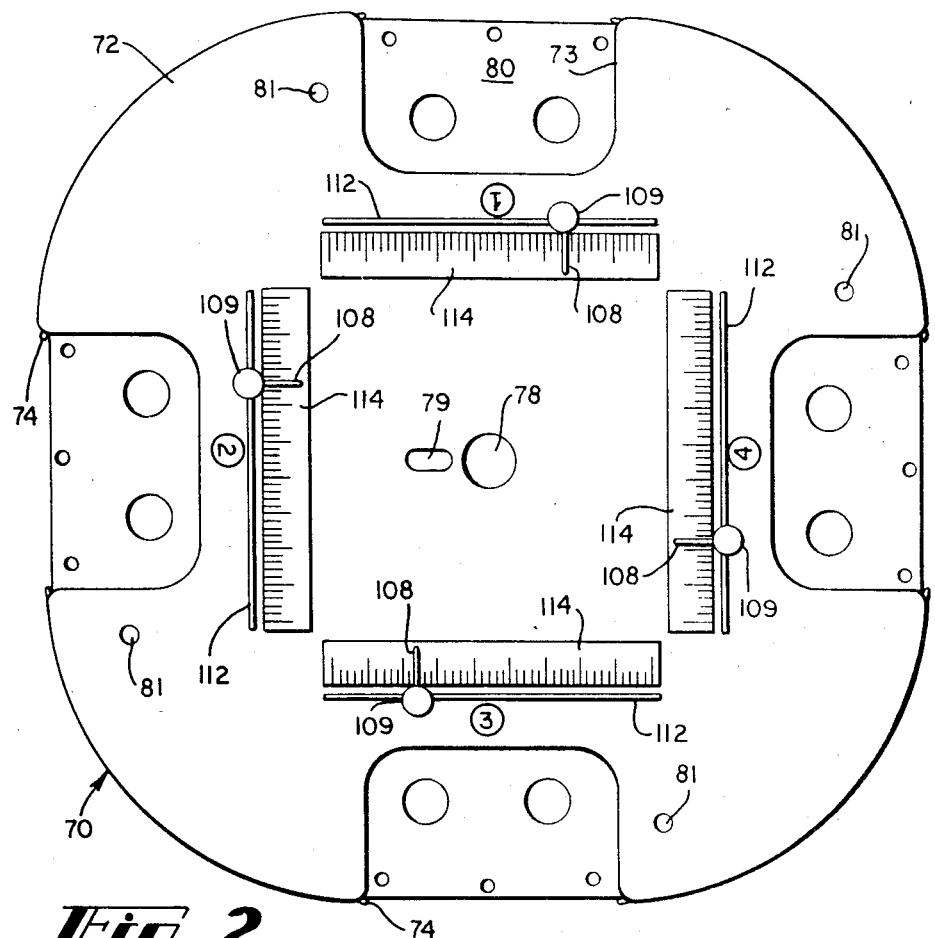
_Fig_2
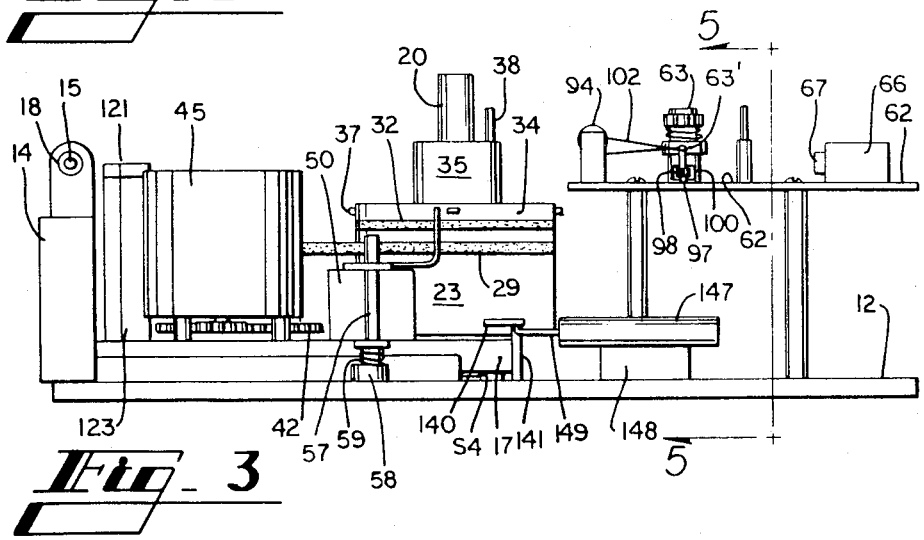
_Fig_3

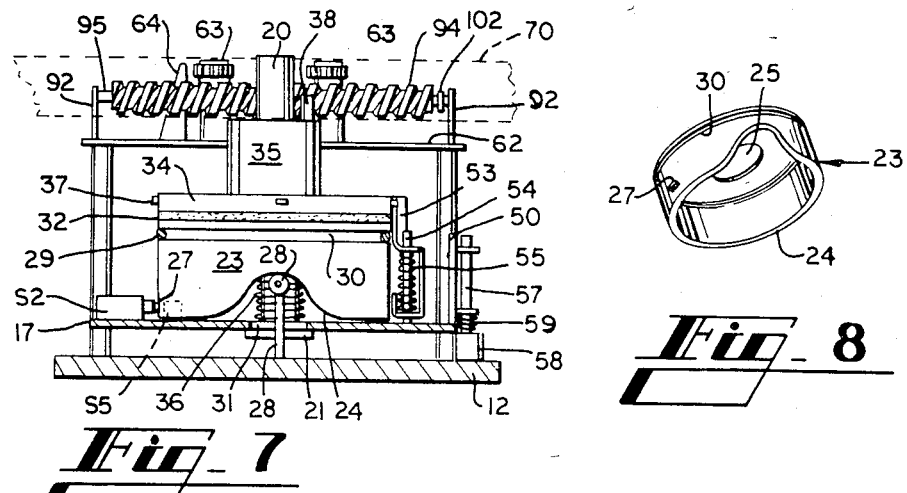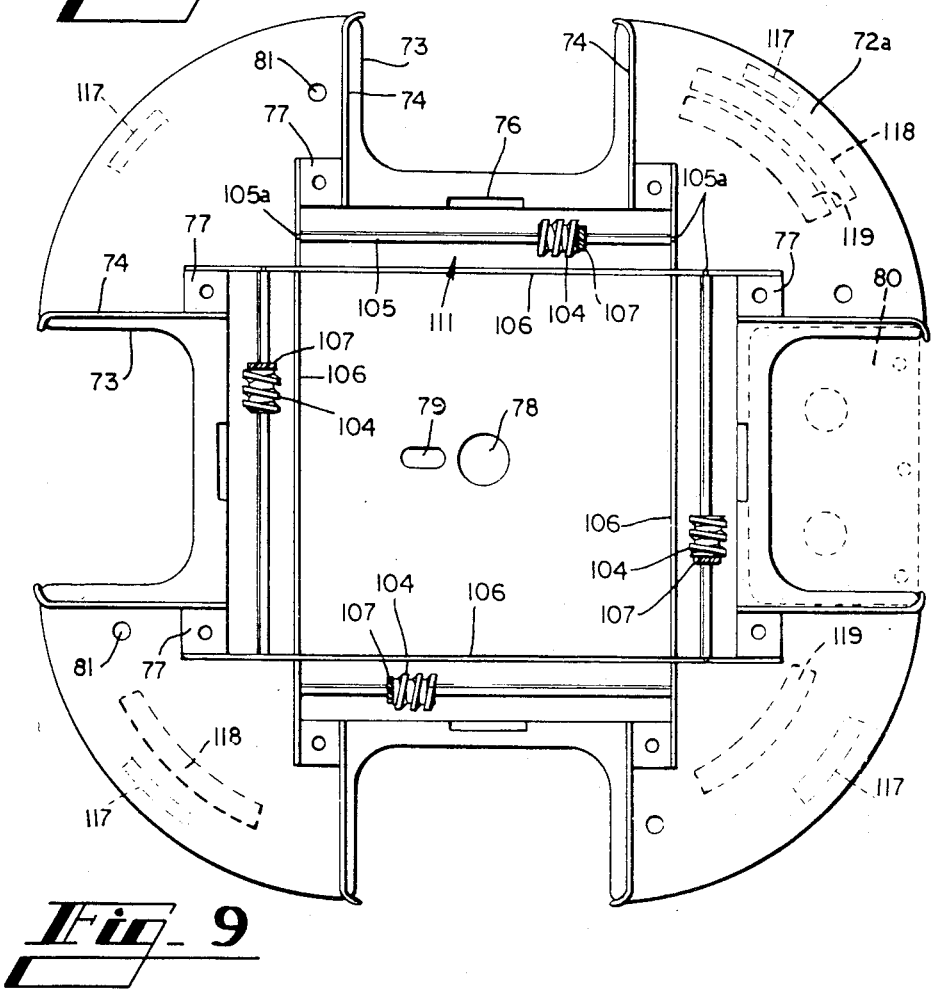

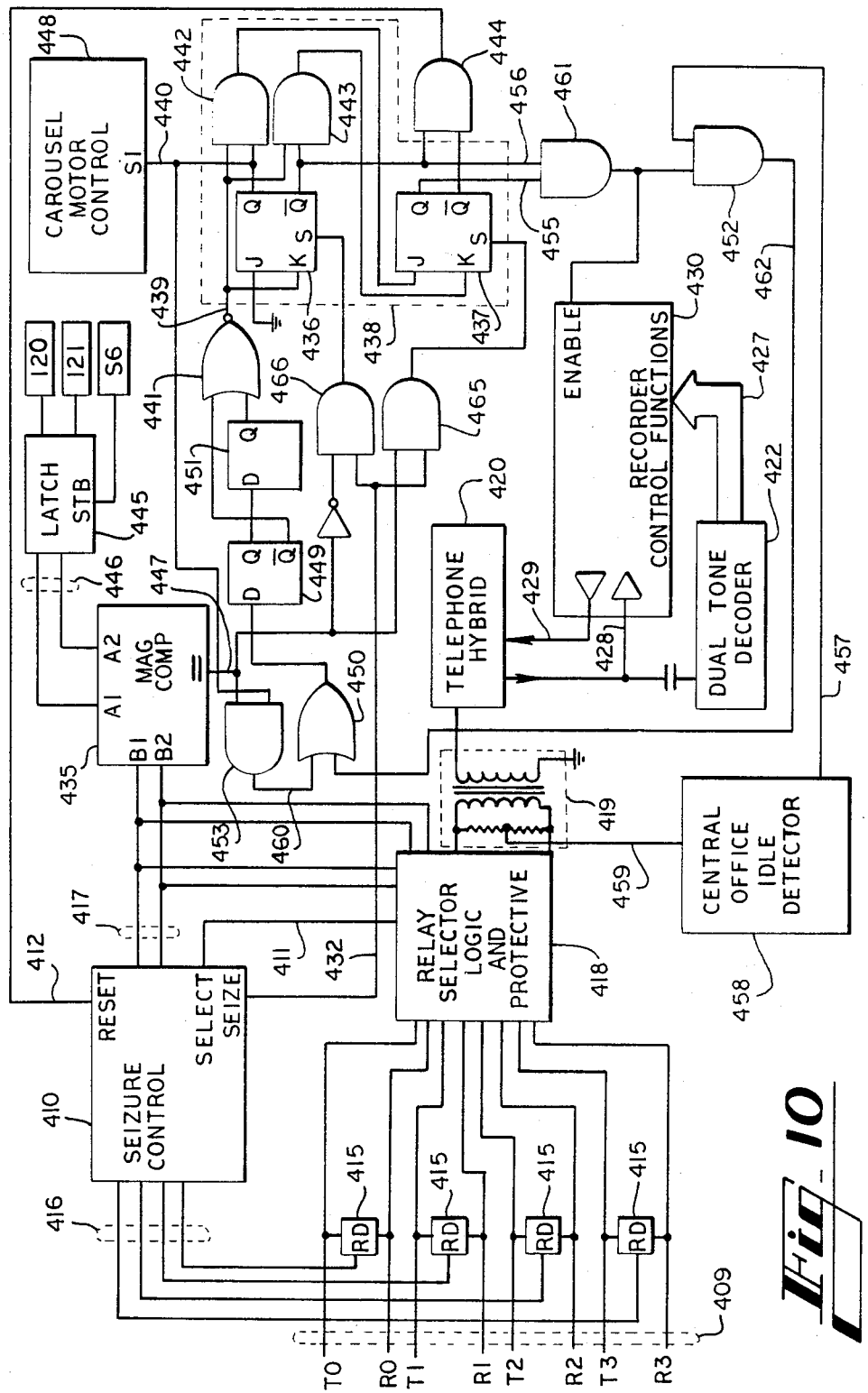
Fig_10

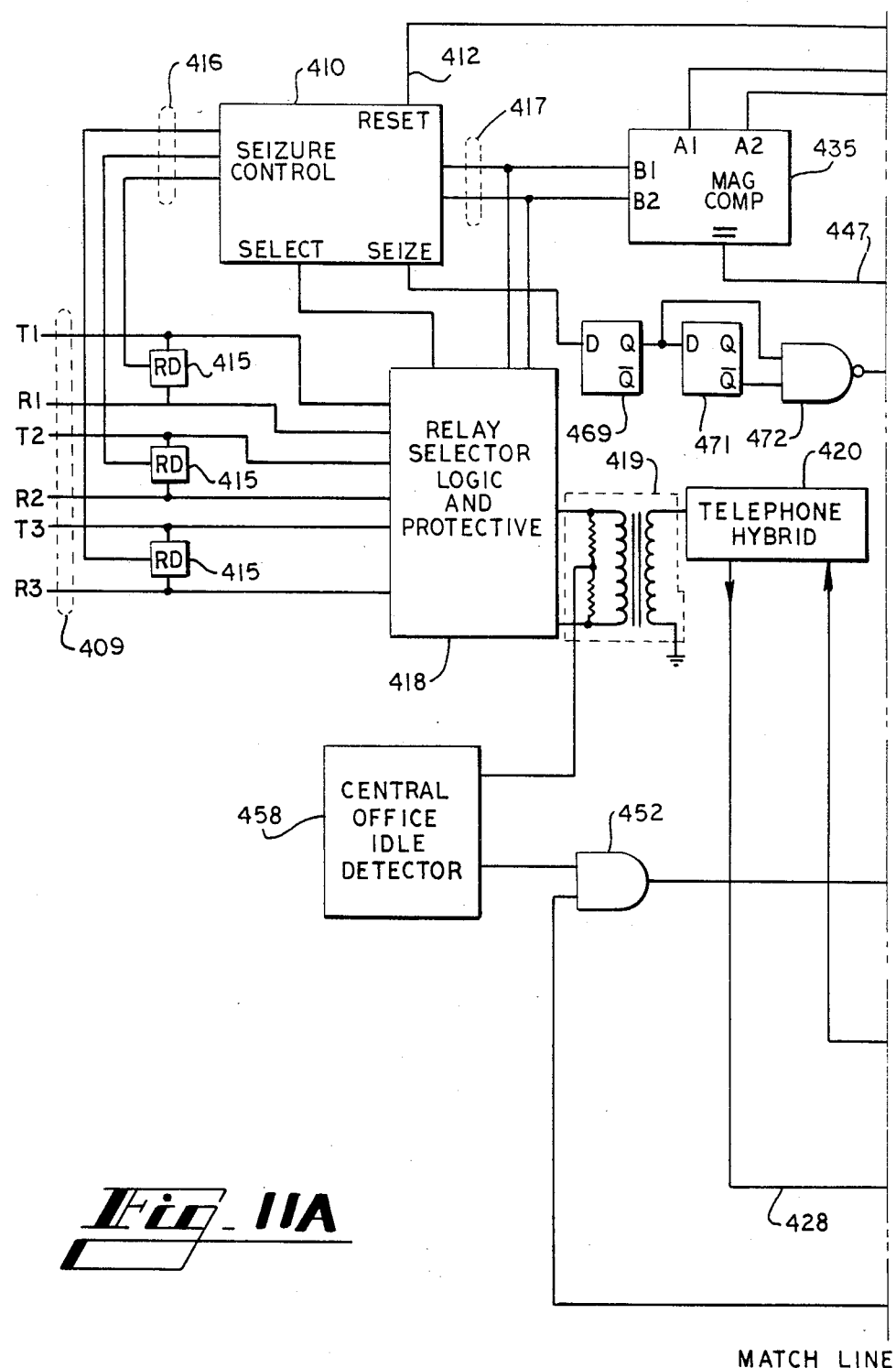
Fig_11A
MATCH LINE

TELEPHONE ANSWERING MACHINE WITH APPARATUS FOR SELECTING PARTICULAR OUTGOING MESSAGE IN RESPONSE TO INCOMING CALL ON A PARTICULAR LINE

CROSS-REFERENCE TO RELATED APPLICATIONS

The present application is a continuation-in-part of Application Ser. No. 78,231 filed Sept. 24, 1979 now issued as U.S. Pat. No. 4,319,290, which in turn is a continuation-in-part of Application Ser. No. 970,357 filed Dec. 18, 1978, now issued as U.S. Pat. No. 4,247,876. Both of said applications are assigned to the assignee of the present invention.

TECHNICAL FIELD

The present invention relates to dictating and telephone answering equipment and more particularly to the fields of dictation equipment which may be remotely operated via telephone lines and to telephone answering devices which automatically answer an incoming call with a predetermined message and subsequently provide a recording apparatus for recording an incoming message.

BACKGROUND OF THE INVENTION

Recent years have seen a proliferation of equipment for both business and home use which allows communication functions to be remotely implemented rather than requiring a person to be in a particular location such as their home or office. Also, miniaturized dictation recorders have been provided which allow the user to record dictation at a plurality of remote locations for later transcription when the recording medium of the recorder is subsequently transported to a transcribing station.

It is known in the art to provide telephone interfaces with dictation equipment at a fixed location which allow a user to operate dictation equipment remotely over telephone lines. It is known to provide control of dictation recorder functions over telephone lines once an incoming call has seized the dictation recorder by the dictation recorder detecting either dial pulse sequences or dual tone combinations provided by conventional dual tone telephone dialing systems.

Recent years have also seen the development of different types of telephone answering systems which will automatically answer an incoming call, provide a recorded message to the caller, and subsequently provide a recording function to allow the caller to record a message for the called party.

In most business applications using remotely operated telephone interface dictation equipment, it is usually the case that a single recording machine will provide satisfactory access to a plurality of dictators which seek to use the equipment. Most commonly, several persons might wish to record dictation during a period in which an office is closed (for example, a weekend) and the provision of a single machine will provide sufficient access for all of the users.

However, in conventional remotely operated dictation equipment interfacing with telephone lines there is only one recording medium available for all of the potential dictators to use. In practice, this constraint results in a single recording medium (such as a cassette) containing a plurality of different types of dictation from a plurality of different dictators. Many offices have internal operating systems which require particular transcriptionists to transcribe the dictation of particular dictators. For such an office to use a conventional remotely operated telephone interfaced dictation system, the recording medium must be passed among various transcribers or appropriate interconnections between the recording equipment and transcribers must be sequentially switched in order to maintain the normal flow of office work. Heretofore it has been necessary to provide a plurality of separate dictation recorders interfaced to telephone lines in order to overcome this limitation of conventional remotely operated dictation recording apparatus.

A limitation of conventional telephone answering equipment has been the inability to select a particular message that will be provided to an incoming caller. It is known in the art to provide a single telephone answering device having a plurality of different answering messages recorded thereon but such devices require selection of one and only one message to be used when the machine is left unattended. For example, one message might be appropriate when the attendant will be absent for a relatively short period of time and another message could be selected which is appropriate for a longer absence of the attendant. However, to change the message, it is necessary to be physically present at the device in order to operate selection apparatus which will select a particular message to be used when incoming calls are answered.

In many business environments a plurality of incoming trunks from a telephone central office are provided to a particular business location. These trunks may be dedicated lines to a particular telephone or, more commonly, are inputs to a business private branch exchange (PBX). It is common in business installations to have particular incoming trunks designated as "private lines" of certain important individuals within the organization. In other business environments a plurality of business operations may be operated by the same personnel at one location. It is often the case for such a business environment to have different trunks listed as the telephone number for the different business operations. Conventionally, an incoming call will be answered by an announcement of the particular business operation which corresponds to the trunk upon which the call was made.

In using conventional telephone answering equipment in such business environments, it has been necessary to either select one particular message which will be provided on all incoming trunks or to provide a plurality of individual telephone answering machines in an environment of dedicated trunks. The provision of a plurality of individual telephone answering machines is expensive and requires that an entire telephone answering machine be provided for each individual trunk for which a distinctive answering message is desired. The aforementioned shortcomings of conventional remotely operated dictation equipment and automatic telephone answering devices are such that the cost of operations tends to increase linearly with the number of individual recording media desired (in the case of dictation equipment) and the number of individual trunks which require distinctive messages (in the case of telephone answering equipment).

It is therefore desirable to provide a device which may be readily interfaced with telephone lines and which will provide a plurality of different recording media to different dictators but will not unnecessarily duplicate expensive mechanical and electronic components as is the case when a plurality of complete and distinct dictation recorders are conventionally provided. It is also desirable to provide a telephone answering system which can provide one of a plurality of distinct messages, depending on the trunk upon which the call is received but which will also not unnecessarily duplicate mechanical and electronic components.

SUMMARY OF THE PRESENT INVENTION

The present invention overcomes the aforementioned shortcomings of conventional remotely operated dictation equipment and telephone answering equipment by providing apparatus in which a single mechanical transport and only one set of record/playback electronics are needed but which also interfaces a plurality of recording media with telephone trunk lines.

The present invention comprises apparatus which carries a plurality of recording media and includes a record/playback station which comprises a conventional recording medium transport and associated playback and recording electronics. Preferably the recording media are conventional tape microcassettes. The present invention further comprises means for establishing an audio connecting path between a telephone trunk line and the recording and playback electronics. The environment of the invention includes apparatus which provides a signal condition indicating a particular trunk of a plurality of trunks upon which an incoming telephone call is received. Such apparatus may be of the type shown herein or may be derived from any conventional PBX system for interfacing a private branch exchange and central office telephone trunks. Of course, the present invention may also be used to detect incoming calls from one of a plurality of customer lines internal to a private branch exchange.

The present invention includes a controller which is responsive to the particular trunk upon which an incoming call is received to place a particular one of the plurality of recording media of the invention in a recording/playback interrelationship with the aforementioned audio connecting path.

It will therefore be appreciated that the present invention is readily adaptable to provide a remotely operated telephone interfaced dictation system wherein one machine having only one transport and one set of record/playback electronics may be used to serve the function of a plurality of conventional dictation recorders.

It will further be appreciated that the present invention may be used to inexpensively replace a plurality of telephone answering machines for a plurality of distinct telephone trunk lines.

One embodiment of the present invention will place one of a plurality of recorded messages on the audio connecting path in response to an incoming call on one of a plurality of telephone trunks. The particular message placed on the audio connecting path is determined by the particular trunk upon which the incoming call was received. After termination of the answering message, a controller automatically indexes a magazine carrying the plurality of recording media to a particular recording medium dedicated to the recording of messages from the incoming calls. Therefore it will be appreciated that the present invention fulfills the need for an inexpensive nonredundant device for placing different appropriate messages on different trunks connected at a particular location and to record all incoming messages provided by callers on the various trunks.

According to another embodiment of the present invention, the controller is responsive to the particular trunk upon which an incoming call is received to cause the magazine carrying the plurality of recording media to index to a particular recording medium associated with the particular trunk. The selected recording medium is then connected to the audio connection path and the caller may then operate the transport and record/playback electronics of the present invention in a conventional manner as a remotely operated telephone interfaced dictation recorder.

It will thus be appreciated that an object of the present invention is to provide a combination of mechanical apparatus and electronic controller responsive to the identity of a particular trunk upon which an incoming call is received to place a particular one of a plurality of recording media in audio communication with the particular trunk.

It is a further object of the present invention to provide an apparatus which eliminates the mechanical and electronic redundancy of using a plurality of separate telephone answering devices or separate dictation recorders but which will functionally replace the same on a time shared basis.

These and other objects of the present invention will become apparent from the detailed description to follow.

BRIEF DESCRIPTION OF THE DRAWINGS

FIG. 1 is a pictorial view of a cassette changer apparatus of an embodiment of the present invention.

FIG. 2 is a top plan view of a cartridge for use in conjunction with the apparatus shown in FIG. 1 carrying four tape cassettes.

FIG. 3 is a left side view of the cassette changer apparatus shown in FIG. 1.

FIG. 7 is a vertical cross sectional view of the cassette changer apparatus shown in FIG. 1, taking along line 7—7 of FIG. 6.

FIG. 8 is a pictorial view of the cam of the cassette changer apparatus.

FIG. 9 is a top view of the cartridge shown in FIG. 2, with the top plate of the cartridge removed.

FIG. 10 is a schematic diagram of a controller for a telephone interfaced remote control dictation recorder embodiment of the present invention.

DETAILED DESCRIPTION

Figure 4:
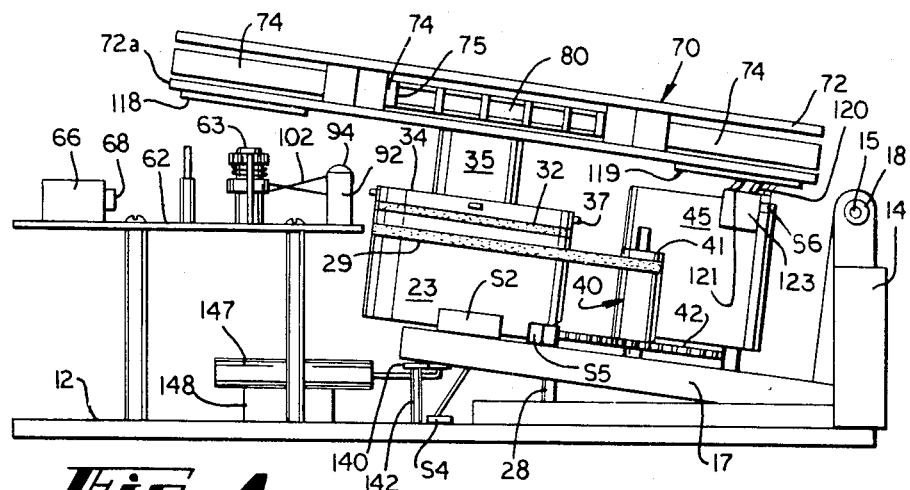
FIG. 4 is a right side view of the cassette changer apparatus shown in FIG. 1, showing a cassette cartridge of the type shown in FIG. 2 mounted on the apparatus in a raised position.
Figure 5:
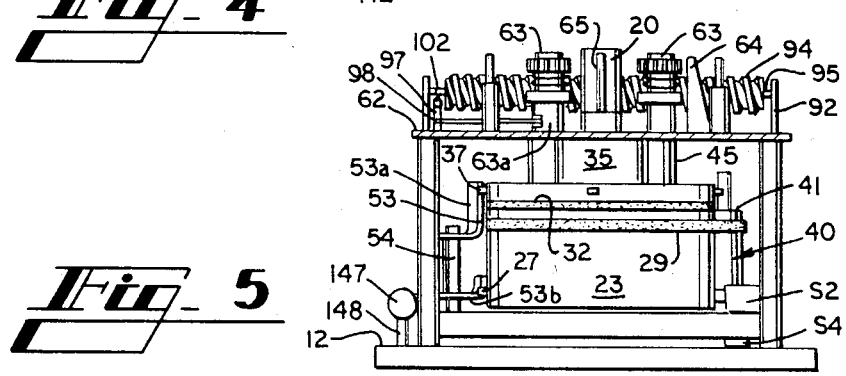
FIG. 5 is an end cross sectional view of the cassette changer apparatus taking along line 5—5 of FIG. 3.

Referring now in more detail to the drawings, in which like numerals refer to like elements throughout the several views, FIG. 1 shows the cassette changer apparatus 10 which, in conjunction with the control circuitry described hereinbelow, embodies the present invention. The changer apparatus 10 includes a rectangular base 12, across the width of which at one end thereof is mounted a pivot rod support member 14 carrying a pivot rod 15 elevated above the base 12. A movable L-shaped frame 17 is pivotally attached at one end thereof to the pivot rod 15 by a pair of pivot bearings 18. Thus, the branch of the "L" attached to the pivot rod 15 is disposed generally vertically, and the other branch extends generally horizontally over the base 12. Near the end of the horizontal portion of the frame 17 furthest from the pivot rod support 14, a generally vertical shaft 20 is fixed to the frame 17 by a shaft nut 21, as shown in FIG. 7.

A cam 23, shown in FIGS. 1, 3–5, 7 and 8, is rotatably mounted on the vertical shaft 20. The cam has the shape of a short cylinder with its upper end enclosed, as shown in FIG. 8. The shaft 20 passes through a shaft-engaging opening 25 in the enclosed upper end of the cam 23, and a cam surface 24 is defined by the edge of the cylinder at its open end. The length of the cylinder varies so that for one-half of its circumference, the cam surface 24 remains a fixed distance from the enclosed end of the cam cylinder. along the other half of the circumference of the cam, the cam surface 24 approaches the enclosed upper end of the cam cylinder. A cam follower 28 is mounted on the base 12 and extends through an opening 31 in the movable frame 17 to engage the cam surface 24, as shown in FIG. 7. As the cam rotates, the cam 23 and cam follower 28 cooperate to lift the frame 17 from a lowered position (shown in FIGS. 3 and 7) to a raised position (shown in FIG. 4).

The cam 23 also includes cam trip 27 projecting from the cylindrical surface of the cam. A cam limit switch S2 mounted adjacent to the cam on the frame 17, is engaged by the trip 27 when the cam 23 (and therefore the frame 17) is at rest in a fully lowered position. The switch S2 is of a type that is closed when released. Another switch S5 is also included which is momentarily closed by trip 27 once during early rotation of the cam. The cam 23 also includes a cam belt groove 30 about the circumference of the cam, the groove 30 receiving a cam belt 29 to drive the cam 23 in a clockwise direction. A limit switch S4 is mounted on the base 12 under the frame 17, and if necessary is embedded or recessed into the base 12 so that the switch S4 is closed when the frame 17 is lowered. Switch S4 is used in conjunction with the electrical displays described in copending Application Ser. No. 72,231 now issued as U.S. Pat. No. 4,319,290. The purposes of switches S2 and S5 will be disclosed in detail hereinafter.

Also mounted on the vertical shaft 20 immediately above the cam 23, are a clutch 32, a clutch-engaging member 34, and a cartridge support member 35. The clutch-engaging member 34 and the cartridge support member 35 are fixed to one another and are together rotatably mounted on the shaft 20. A clutch biasing spring 36 biases the cam 23 against the clutch-engaging member 34. Thus, when the came 23 is rotated about the shaft 20, the cartridge support member 35 tends to rotate with the cam. The cartridge support member 35 includes a vertically extending cartridge locator key 38 to properly position a cartridge 70 placed on the cartridge support member 35 by extending into an opening in the cartridge, and to carry the cartridge with the support member 35 as it rotates. the cartridge 70, as shown in FIGS. 2, 4 and 9, includes a plurality of cassette locations, each for retaining a tape cassette. The clutch-engaging member 34 of the present embodiment includes four cartridge motion stops 37 extending from the circumference of the clutch-engaging member 34 spaced at equal intervals 90° apart around the cartridge motion stops 37. It will be understood that the number of clutch-engaging members 34 will correspond to the number of tape cassettes or other recording media carried by the cartridge 70.

A cam drive pulley 40 is rotatably mounted on the frame 17 next to the cam 23. A small diameter upper member 41 of the pulley 40 carries the cam belt 29. A larger diameter lower member 42 of the pulley 40 forms a gear which is driven by a drive gear (not shown) at the base of a DC motor 45. The DC motor 45 may alternately drive the pulley 40 by means of a belt similar to the belt 29. The DC motor 45 is operated by a power supply (not shown).

Figure 6:
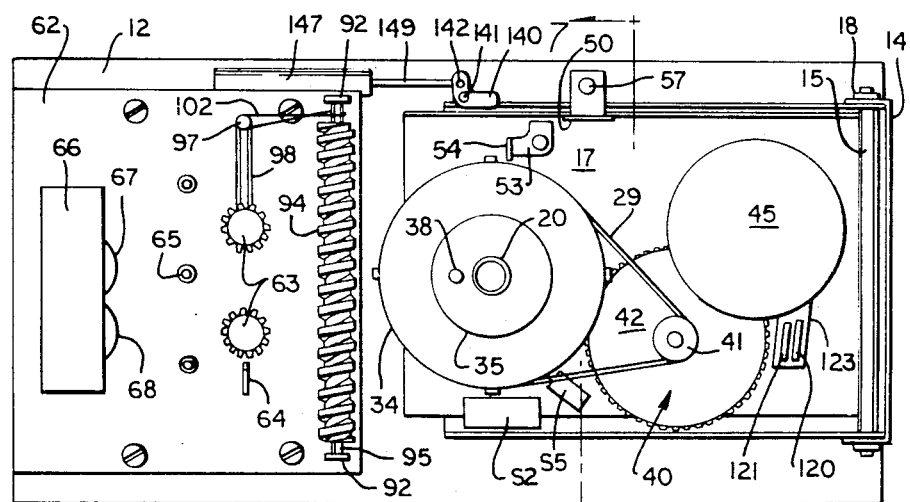
FIG. 6 is a top view of the cassette changer apparatus shown in FIG. 1.
Figure 12:
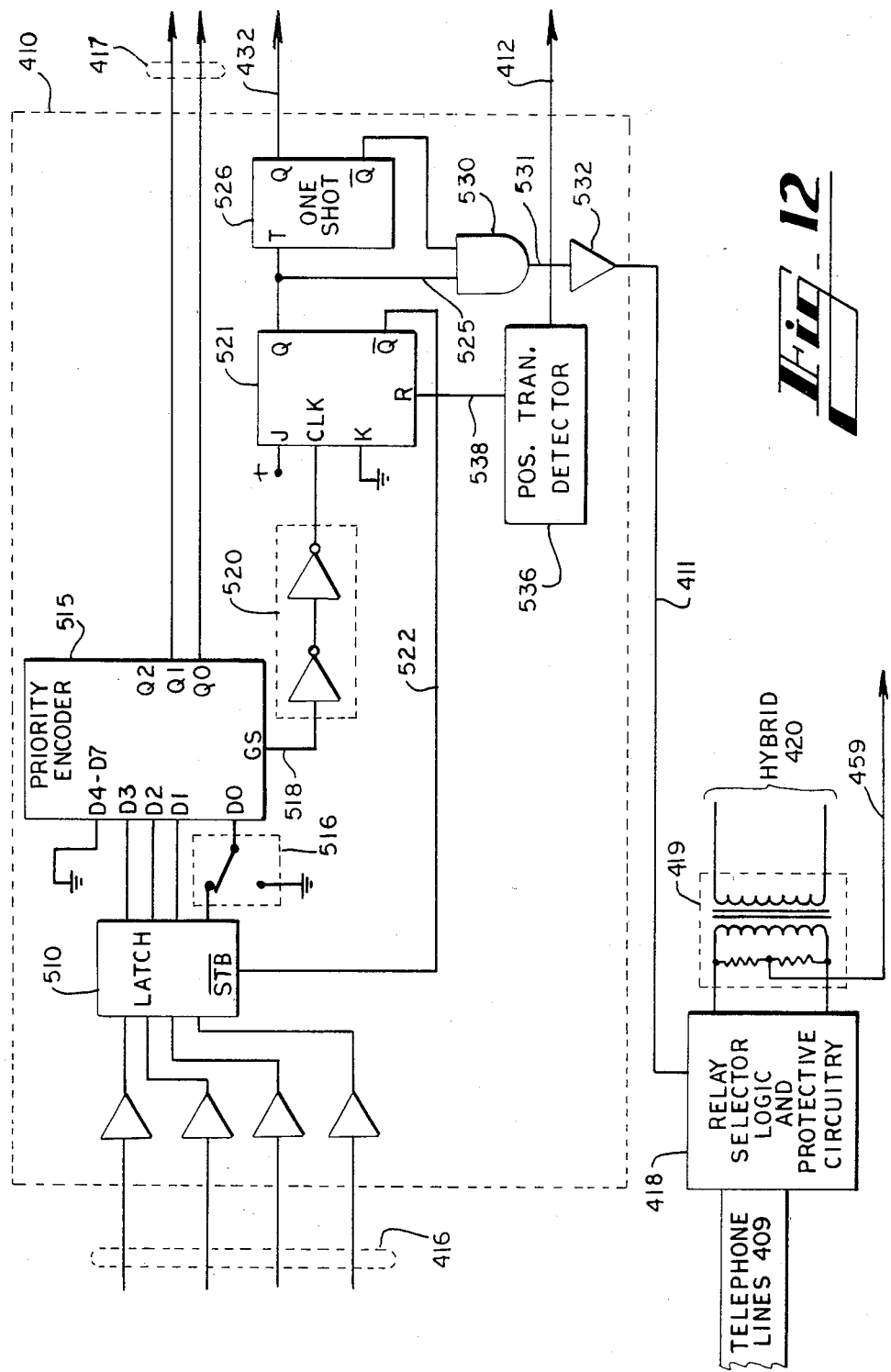
FIG. 12 is a schematic diagram of an embodiment of the line seizure control apparatus of FIGS. 10 and 11.

A pivot link 53 is pivotally mounted adjacent to the cam 23 on a vertical axle 54 extending upwardly from the frame 17. The unitary pivot link 53 includes a brake member 53a formed at the upper end of the pivot link 53 and a trigger member 53b formed at the lower end of the pivot link 53, as shown in FIG. 12. A spring 55 biases the pivot link 53 in a clockwise direction into a position wherein the brake member 53a lines in the path of the cartridge motion stops 37 and the trigger member 53b lines in the path of the cam trip 27, as best shown in FIGS. 6 and 7. Thus, when the cam 23 rotates, the cam trip 27 engages the trigger member 53b, rotating the pivot link 53 against the bias of the spring 55, and thereby removing the brake member 53a from the path of the cartridge motion stops 37. This allows the slip clutch 32 to carry the clutch-engaging member 34 with the cam 23. Since the cam trip 27 displaces the pivot link 53 only momentarily, the brake member 53a is urged back into place near the circumference of the clutch-engaging member 34 by the spring 55, so that when the next stop 37 arrives at the position of the pivot link 53, the motion of the clutch-engaging member 34 will again be arrested. Clearly, the force of the spring 55 must be sufficiently great to overcome the tendency of the clutch 32 to move the clutch-engaging member 34.

In order to ease the descent of the frame 17 from a raised to a lowered position as the cam 23 rotates, a dash pot 57 having the foot 58 extending therefrom and biased outwardly by a spring 59, is mounted on a vertical support bracket 50 at the side of the frame 17. The bracket 50 is thus carried up and down by the frame 17. As the frame 17 is lowered by the cam, the foot 58 engages the base 12 and eases the frame 17 into a lowered position.

The cassette changer apparatus 10 also includes a means for selectively holding the frame 17 in its raised position regardless of the rotation of the cam 23. As shown best in FIGS. 3 and 6, this means is provided by an "L" shape pivoted latch 140 pivotally mounted at the bend of the "L" on a vertical pivot axle 141 which is fixed to the base 12 immediately adjacent to the side of the frame 17. The latch 140 is mounted on the axle 141 at a height such that the latch 140 can be pivoted under the frame 17 when the frame 17 is in a fully raised position, and can carry the weight of the frame 17 to maintain the frame 17 in a fully raised position. The insertion of the latch 140 under the frame 17 is accomplished by means of a solenoid 147 which is mounted on a support bracket 148 to the base 12 in a location such that a piston rod 149 extending horizontally from the solenoid 147 can be pivotally connected at 142 to the arm of the "L" shaped latch 140 that extends away from the frame 17.

When power is applied to the solenoid 147 by a control circuit to be described hereinafter, the piston rod 149 extends out of the solenoid 147, causing the other arm of the "L" shaped latch 140 to be pivoted under the frame 17. When the power to the solenoid 147 is cut off, a spring (not shown) within the solenoid 147 retracts the piston rod 149 to pivot the latch 140 out from beneath the frame 17. Operation of the solenoid 147 and latch 140 allow the operation to change from one cassette location directly to another cassette location not immediately adjacent to the original location, in a manner to be described hereinafter.

Mounted to the base 12 beyond the end of the horizontal portion of the frame 17 is a tape transport deck 62 supported on a plurality of transport deck support legs 61. The tape transport deck 62 carries a tape transport mechanism well-known to those skilled in the art. The mechanism includes rotatable projections for driving cassettes, namely, a pair of spindles 63, enclosed in housings 63a, and a capstan 65. The deck 62 also includes a tapered locator key 64 for engaging a cartridge 70 and guiding it into proper position with respect to the transport mechanism, and a movable transducer head assembly 66 which includes a pinch roller 67 for engaging the capstan 65, and a record/listen head 68. A means (not shown) is provided for slidably moving the transducer head assembly 66 into and out of engagement with a tape cassette placed in a record/listen position on the tape transport deck 62, in a conventional manner known to those skilled in the art, wherein the pinch roller 67 and head 68 enter apertures in the wall of the cassette.

Also mounted on the tape transport deck 62, near the edge of the deck 62 nearest the frame 17 is a worm gear 94. The worm gear 94 is rotatably carried by an axle 95 which is journaled into a pair of axle supports 92 mounted at the opposite sides of the deck 62, as shown in FIG. 6. Worm gear 94 is used in conjunction with the mechanical tape displays described in copending Application Ser. No. 78, 231 now issued as U.S. Pat. No. 4,319,290.

In the present invention, individual recording media are carried by a cartridge 70, as shown in FIGS. 2 and 9. The cartridge 70 includes a pair of retaining members in the form of upper and lower parallel plates 72 and 72, each including a plurality of cutouts 73, radially disposed about the center of the cartridge 70. Disposed between the parallel plates 72 and 72a at either side of each cutout 73 are a pair of flexible guides 74. The guides 74 are spaced apart approximately the length of a standard microcassette. In the embodiment shown, standard microcassettes 80 are utilized. The inner ends of the guides 74 are attached to blocks 77 which serve to attach the parallel plates 72 and 72a to one another and to support the guides 74. The guides 74 each include a small projection 75 at the outer end of the guide 74 extending toward the cutouts 73. A rear stop 76 is located inwardly of each cutout 73 approximately the width of a standard microcassette 80 from the projections 75 on the flexible guides 74. Thus, a standard microcassette 80 may be slidably inserted between the parallel plates 72 and 72a and between a pair of the flexible guides 74 until the cassette meets a rear stop 76. The flexible guides 74 are biased against the sides of the microcassette, and therefore the projections 75 on the guides 74 removably retain the microcassette within the cartridge 70 at a fixed cassette location. Alternately, one of each pair of guides 74 may be rigid and the other guide flexible, so that the guides will still press against the sides of the microcassette, but the microcassette will be more accurately positioned within the cartridge than when both guides are flexible. The cutouts 73 are somewhat smaller in area than the cassettes, so that the parallel plates 72 and 72 restrain the cassettes, but the openings in the cassettes are exposed for insertion of the rotatable spindles 63 and capstan 65 of the transport mechanism, and the cassettes may still be grasped at the location of the cutouts 73 for insertion and removal of the cassettes into and out of the cartridge 70.

The cartridge 70 also includes a shaft opening 78 at the center thereof so that the cartridge 70 may be placed over the vertical shaft 20 and come to rest upon the cartridge support member 35, as shown in FIG. 4. A keyway 79 is provided to receive the cartridge locator key 38 on the cartridge support member 35. Furthermore, a positive locator keyway 81 is located adjacent each cassette position in the cartridge 70. Each locator keyway 81 receives the locator key 64 mounted on the transport deck 62 when the cartridge 70 is lowered onto the tape transport deck 62 with the associated cassette location positioned over the deck 62. The tapered nature of the locator key 64 guides the cartridge 70 into precise alignment with the transport deck 62, rather than relying on the dead stop of the cartridge motion stops 37 against the pivot link 53.

Other apparatus which may be advantageously used in conjunction with embodiments of the present invention are described fully in copending Application Ser. No. 970,357, filed Dec. 18, 1978 entitled "DICTATION RECORDING AND TRANSCRIBING SYSTEM UTILIZING A MULTIPLE MEDIA CARTRIDGE APPARATUS", now U.S. Pat. No. 4,247,876, and Application Ser. No. 78,231, filed Sept. 24, 1979 entitled "DICTATION RECORDING AND TRANSCRIBING METHOD AND APPARATUS INCLUDING DISPLAY FOR MULTIPLE RECORDING MEDIA", now issued as U.S. Pat. No. 4,319,290. Said U.S. Pat. No. 4,319,290 and U.S. Pat. No. 4,247,876 are hereby incorporated by reference exactly as if set forth in full herein.

From the foregoing it will be appreciated that the mechanical apparatus embodying the present invention provides the ability to selectively engage, one at a time, a plurality of recording media located in the four cassette positions 73 on cartridge 70 with the transport and record playback head apparatus located on deck 62. Thus it will be appreciated that the mechanical apparatus shown in FIGS. 1-9, together with the control circuitry described hereinbelow, comprise a recording medium control means for alternately placing each of a plurality of recording media in recording relationship with transducer 67. It will therefore be appreciated with the provision of appropriate control circuitry, described hereinbelow, the present invention allows the control circuitry to cooperate with the mechanical element shown in FIGS. 1-9 to provide new and unique telephone answering apparatus and telephone interfaced remote control dictation recorders.

REMOTE CONTROL DICTATION EMBODIMENT

Turning to FIG. 10, control circuitry for a first preferred embodiment of the present invention comprising a telephone interfaced remote control dictation is shown.

As may be seen from FIG. 10, a plurality of telephone trunk lines 409 will provide input to the preferred embodiments of the present invention. In FIG. 10 it is assumed that trunks 409 are central office trunks. Each trunk of trunk lines 409 comprises a tip and ring pair. In FIG. 10 four such tip ring pairs are shown (T0, R0) through (T3, R3).

Each tip ring pair has a ring detector 415 disposed across the pair. Ring detectors 415 are conventional in construction and provide a positive voltage on one of lines 416 in response to detecting a ringing signal on the trunk to which the ring detector is attached.

Trunks 409 are provided as inputs to relay selector logic and protective circuitry block 418. It will be understood such a circuitry is conventional relay switching circuitry for connecting one of trunks 409 to transformer 419 according to the states of lines 417 and circuitry necessary to comply with Part 68 of the regulations of the Federal Communications Commission. The output of relay selector 418 appears on the primary of transformer 419 which couples the AC component of the telephone signal to telephone hybrid 420. While the preferred embodiments of the present invention are adapted for connection to telephone lines, it will be appreciated that it has many uses in embodiments not connected to a telephone. It will therefore be appreciated that trunks 409 are, generically, audio links to the user and that a ring signal on one of trunks 409 is a call signal.

It will be appreciated by those skilled in the art that the enablement of selector 418 via a logical one on line 411 will cause one of trunks 409 to be connected to the primary of transformer 419. This condition allows loop current to flow in the particular trunk selected by the state of lines 417 and will thus trip the ring at the telephone company central office and establish seizure of the trunk when loop current begins to flow.

Trunk seizure control circuitry 410 provides a two bit binary number on lines 417 which corresponds to the particular one of trunks 409 which will seize the machine. Telephone hybrid 420 is coupled to a dual tone decoder 422 which provides a decoded output from conventional dual tone telephone signals to control recorder control functions shown in block 430. It is to be understood that dual tone decoder 422 is conventional in nature and may also be replaced by a conventional dial pulse counter. It is also to be understood that lines 427 control conventional recorder functions such as record, playback fast forward and others. The incoming signal of hybrid 420 is also provided along line 428 as the audio input to the conventional control and record/playback electronics shown as block 430. The output of the playback amplifier of the recorder is shown as line 429.

The remaining control circuitry of FIG. 10 cooperates with the mechanical elements of the preferred embodiment shown in FIGS. 1-9 to provide the relatively inexpensive multiple recording media telephone interfaced remote control dictation recorder set forth in the objects of the invention.

As noted above, when an incoming call is received, trunk seizure control 410 provides a two bit number on lines 417 which indicates the particular trunk which is being answered and provides a logical one pulse on line 432 upon seizure of that trunk. The pulse on line 432 is provided through one of AND gates 465 and 466 to the direct set input of either flip-flop 436 or 437.

As will become apparent from the description below, the other input to AND gate 466 (the inverse of point 447) will be one whenever an operating sequence begins and a recording medium which does not correspond to the trunk upon which the incoming call is received is at deck 62. Under these conditions flip-flop 436 will set. If the recording medium corresponding to the trunk called is at deck 62, flip-flop 437 will set.

Figure 11B:
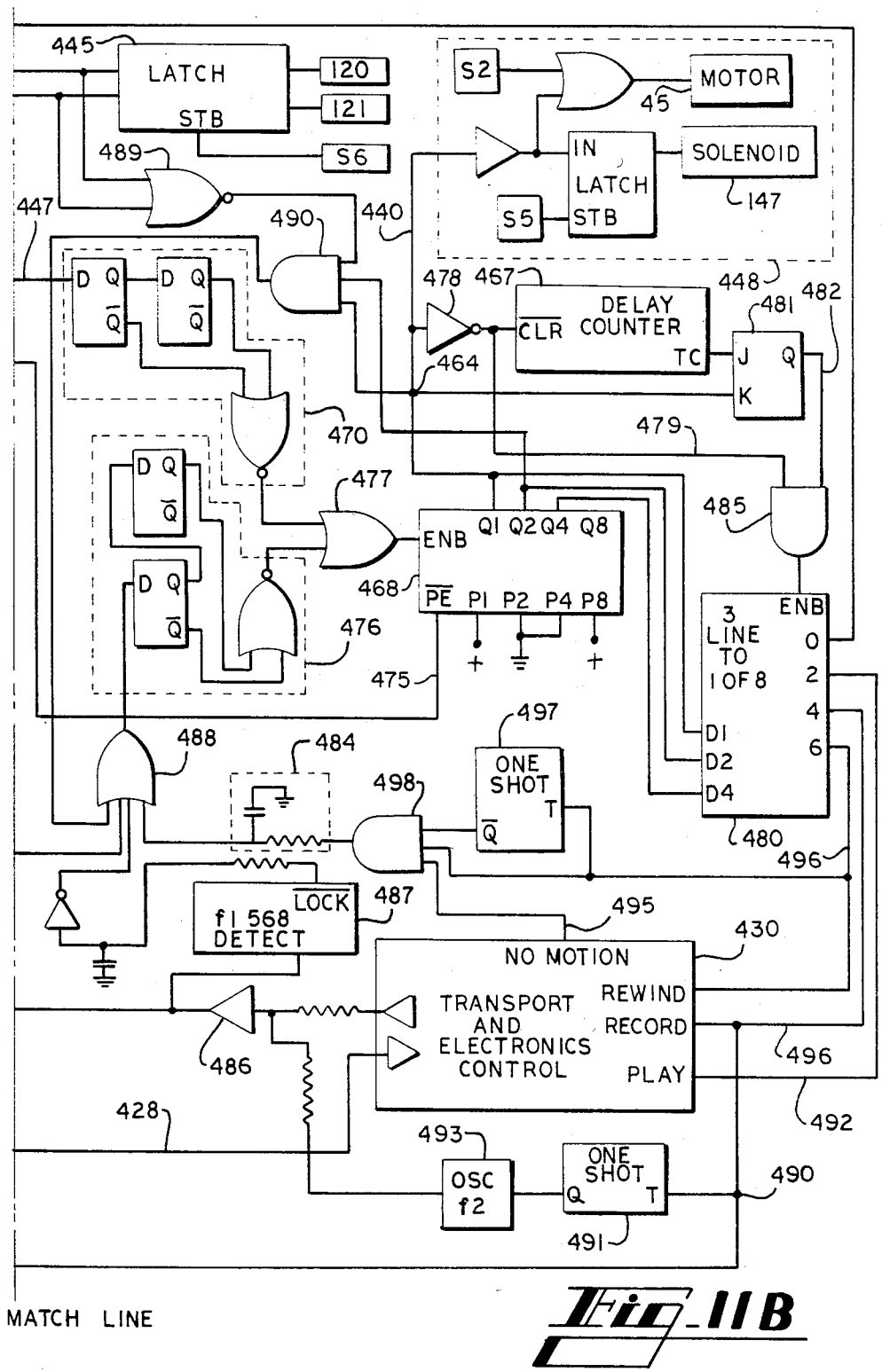
FIGS. 11A and B are a schematic diagram of a controller for a multiple message telephone answering embodiment of the present invention.

It is to be understood that all synchronous counters and flip-flops, the clock inputs of which are not shown in FIGS. 10 or 11 are to be connected to a common high speed clock (not shown) in a conventional manner.

As may be seen from FIG. 10, flip-flop 436 comprises one flip-flop of a specialized two bit counter 438 wherein flip-flop 436 is considered the least significant bit and flip-flop 437 is considered the most significant bit. It will be apparent to those skilled in the art that a logical one at point 439 from NOR gate 441 acts as an enable input to counter 438. From the innerconnection of point 439 and the connection of AND gates 442 and 443, it will be appreciated that counter 438 will count through the following sequence 00,01,10, and toggle back to 00. It will also be appreciated that this counter will remain in the 00 state without regard to the state of point 439 except when a direct set input to flip-flop 436 or 437 is provided along line 432 as described above. Therefore the 00 state of counter 438 is stable and the counter will not exit this state unless a positive transition from the seize output of trunk seizure control 410 has been provided.

The control circuitry of FIG. 10 indexes a particular one of the microcassettes contained in cartridge 70 (FIGS. 2 and 9) into operative engagement for the recording of dictation with the transport on deck 62 (FIGS. 1 and 3). It will therefore be appreciated that each state of lines 417 from the output of trunk seizure control 410 will correspond to one cassette position 73 of cartridge 70. It will further be appreciated that the control circuitry of FIG. 10 must be designed with the presumption that the cartridge may have any one of the four microcassettes carried therein engaged with the transport at the time an incoming call is seized.

As has been described in detail in U.S. Pat. No. 4,319,290, switches 120 and 121 (FIG. 1) in conjunction with cams 118 and 119 (FIG. 9) detect which of the microcassette positions engaged with the transport. As cartridge 70 is rotated, cams 118 and 119 will close a combination of switches 120 and 121 which provide a direct binary readout corresponding to binary zero through binary three (11) to indicate the cassette position approaching the transport. As may be seen from FIG. 9, a third cam 117 is provided which strobes a third switch S6 (FIG. 1) which is mounted parallel to switches 120 and 121. This provides a short pulse from the output of switch S6 during each quarter rotation of cartridge 70. The pulse from switch S6 is provided to the strobe input (STB) of latch 445 and thus latches the states of switches 120 and 121 onto lines 446.

As may be seen from FIG. 10, lines 446 comprise one set of inputs to a magnitude comparator 435, the other set of inputs being provided by the two bit binary encoded output on lines 417 corresponding to the particular trunk which has been seized. Therefore a logical one will be provided from the equal (=) output of magnitude comparator 435 on line 447 whenever the cassette position corresponding to the particular seized trunk is either engaged with the transport or is approaching the transport during a change operation. It will therefore be appreciated that the B inputs of magnitude comparator 435 (from lines 417) comprise an indexing signal corresponding to a particular one of trunks 409 upon which an incoming call has been received.

If it is assumed for the moment that cartridge 70 is in a position which does not correspond to the particular trunk which has just been seized, it will now be described how the control circuit of FIG. 10 ascertains when the proper cassette position is approaching the transport.

The setting of flip-flop 436 by one shot 431 upon seizure causes a logical one to appear on line 440. Line 440 is provided to an input labeled S1 of carousel motor control block 448. A logical one on line 440 correspond to operation of switch S1 described in U.S. Pat. No. 4,319,290. On FIG. 11 the internal components of block 448 are shown. It is sufficient for the understanding of operation of the present invention to appreciate that so long as a logical one is present on line 440 the cartridge 70 of the present invention will continue to rotate and that removal of the logical one on line 440 will cause the next microcassette approaching the transport to be lowered into operative engagement therewith.

As each cassette position approaches the transport, switch S6 will strobe latch 445 and latch onto lines 446 a binary number corresponding to the cassette position approaching the transport. When the cassette position corresponding to the particular one of trunks 409 which has been seized is approaching the transport, magnitude comparator 435 provides a logical one on line 447 which propagates through AND gate 453 to line 460. The logical one on line 447 appears on line 460 because the other input to AND gate 453 from line 440 is also a logical one. The logical one on line 460 drives the output of OR gate 450 high. It may be seen from inspection of the inputs of AND gate 452 that under the conditions described its output will be zero. Therefore the appearance of a logical one on line 447 during rotation of cartridge 70 causes the output of OR gate 450 to undergo a transition from zero to one.

It will be appreciated by those skilled in the art that the combination of flip-flops 449 and 451 and NOR gate 441 provide a pulse one clock period wide to point 439 when the output of OR gate goes from zero to one. This pulse enables counter 438 to go from its 01 to its 10 state upon the next occurrence of a clock transition.

When counter 438 enters its 10 state the logical one is removed from line 440 and the microcassette corresponding to the particular trunk seized be lowered into position on the transport ready to accept recorded dictation. The 10 state of counter 438 provides logical ones on lines 455 and 456 to AND gate 461 which enables the conventional recorder control functions and playback and record electronics. The logical one output of AND gate 461 also conditions AND gate 452 to provide a logical one on line 462 whenever central office idle detector 458 detects termination of trunk seizure by the telephone company central office. It will be appreciated by those skilled in the art that central office idle detector 458 may be of any conventional construction which will provide a logical one on line 457 upon detection of an idle condition on the trunk connected to the outputs of relay selector logic 418.

During the 10 state of counter 438 prior to detection of an idle condition on the trunk the control functions of the tape transport and the record/playback electronics may be controlled from the telephone trunk in a conventional manner. Dual tone decoder 422 will decode pairs of tones corresponding to depression of particular keys on a standard dual tone telephone or, as noted above, may be embodied as a dial pulse counter for control of the recorder from rotary dial telephones. Conventional telephone hybrid 420 establishes an audio communication path along lines 428 and 429 to and from the audio input and output of the record/playback electronics in block 430.

It will therefore be appreciated that upon receiving an incoming call on a particular trunk the first preferred embodiment of the present invention shown in FIG. 10 will cause a particular microcassette within cartridge 70 to be placed in an operative condition for recording dictation from the telephone trunk.

It will further be appreciated that circuitry on FIG. 10, including comparator 435, switches 56, 120 and 121, and flip-flops 436 and 437, comprise a control means responsive to the system being rendered operative by a dictator calling on one of trunks 409 to place one of the recording media carried on cartridge 70 (FIG. 2) in a recording position and will prevent the system from placing the remaining media in the recording position.

Therefore if trunks 409 represent private lines or lines otherwise designated for remote reception of particular types of dictation, the present invention will index to the appropriate recording medium for acceptance of such dictation.

When the dictator terminates seizure of the trunk by placing his telephone on hook, a logical one on line 457 causes a logical one to appear on line 462 which in turn causes a zero to one transition on the output of OR gate 450. As described hereinabove this transition causes a pulse one clock period wide to appear at point 439 enabling counter 438 to count from its 10 state back to its stable 00 state. The 00 state is detected by AND gate 444 which provides a logical one on line 412 to the reset input of trunk seizure control 410. As described hereinabove a positive transition on line 412 causes trunk seizure detector 410 to reset, and thus be placed in condition to accept another incoming call.

In the event that the apparatus of the first preferred embodiment was in a state which had the proper microcassette operatively engaged with the transport for the trunk seized, it will be appreciated that the pulse from line 432 will propagate through AND gate 465 and will not pass through AND gate 466 thus directly setting counter 438 to its 10 state enabling operation of control and electronics 430.

TELEPHONE ANSWERING EMBODIMENT

The controller for a second embodiment of the present invention is shown in FIG. 11. In FIG. 11 the same devices which appear in FIG. 10 are referenced with the same numerals. In the second preferred embodiment including the controller of FIG. 11 only three trunks are shown because three separate messages are provided on three of the microcassettes contained in cartridge 70 while the fourth cassette is used for recording of messages.

It will therefore be appreciated that the seizure of one of trunks 409, the detection of the particular trunk seized, and the audio connections through telephone hybrid 420 are the same as described hereinabove for the controller of first preferred embodiment.

The controller of FIG. 11 implements the following function when an incoming call is received on one of trunks 409. It is assumed that the user of the second preferred embodiment has recorded three distinct messages on each of three different microcassettes in location 1-3 (01-11) on cartridge 70. Each distinct messages corresponds to a message which is appropriate for answering a particular one of the three trunks 409. For example if three business operations were using the same telephone system at one location and each operation corresponded to one of trunks 409, each message might announce that the caller had reached one of the particular business operations and request that a message be left after occurrence of a tone.

As will become apparent from the description to follow, the apparatus of FIG. 11 causes the following operations to occur. When a call is received on a particular one of trunks 409 controller of FIG. 11 causes mechanical apparatus shown in FIGS. 1-9 to place the appropriate message cassette in operative relationship with the transport and to deliver the prerecorded message to the calling party. Upon termination of the prerecorded message the controller indexes cartridge 70 to place the cassette (00) dedicated to recording of incoming messages in operative relationship with the transport. Upon detection of loss of central office seizure of the trunk, indicating the calling party has hung up, the controller of FIG. 11 causes cartridge 70 to index back to the prerecorded message which has just been delivered, to rewind the microcassette containing the message, and then to return to an idle state waiting for the next call.

As indicated hereinabove, block 448 controlling motor 45 of the mechanical apparatus is shown in detail in FIG. 11. It may be seen that block 448 is identical to FIG. 16 of U.S. Pat. No. 4,319,290 with the aforementioned exception of line 440 replacing switch S1. As has been described hereinabove, activation of solenoid 147 causes cartridge 70 to continue to rotate past an approaching cassette position and when logical one is removed from line 440 the next occurrence of a strobe output from switch S5 deactivates solenoid 147 which will cause cartridge to be lowered and motor 45 to shut off when cam 27 (FIG. 8) engages the actuator for switch S2 opening same.

As will become apparent from the description to follow the apparatus of the second preferred embodiment always begins with the zero cassette position of cartridge 70 engaged with the transport. Recall that the zero cartridge position corresponds to the microcassette upon which incoming messages are recorded. Therefore upon seizure of a trunk by seizure control 410 the equal (=) output of magnitude comparator 435 which appears on line 447 will be zero since there is no trunk connected in the embodiment of FIG. 11 which cause a 00 output on lines 417.

The second preferred embodiment includes a state counter 468 which performs a function analogous to counter 438 of the first preferred embodiment, a delay counter 467, and a three line to one-of-eight decoder 480 for decoding control functions to transport and electronics control block 430.

As is the case with the first preferred embodiment operation begins when trunk seizure detector 410 evidences seizure of one of trunks 409 by providing a zero to one transition at point 411. The transition at point 411 is provided to a pair of D-type flip-flops 469 and 471 which, together with NAND gate 472, provide a negative going pulse one clock period wide on line 475. The negative going pulse on line 475 is provided to the negated parallel enable (PE) input of state counter 468 which causes the counter to load 1001 as may be seen from inspection of the parallel inputs P1-P8 of this counter. The loading of a one into eight's place for the counter is designed to effectively make the counter a scale of eight counter in the embodiment shown in FIG. 11. Since the Q8 output of the counter is not brought out to any connection within the controller of FIG. 11, the states of counter 468 will be described as the state of bits Q1-Q4 of state counter 468. Therefore the loading of counter 468 forces the counter to its 001 state.

The structure of the controller of FIG. 11 includes several generalized features which will now be described. The Q1-Q4 state bits of counter 468 are provided as the inputs to decoder 480. The least significant state bit (Q1) is provided to point 464 and therefore to the K input of flip-flop 481. The least significant bit is inverted by inverter 478 the output of which is provided along line 479 as an input to AND gate 485 and also provided to the negated clear (CLR) input of delay counter 467. Since the negated form of the Q1 state bit is an input to AND gate 485 it will be seen that this AND gate provides a zero output to the enable (ENB) input of decoder 480 during all odd numbered states of state counter 468 and conditions AND gate 485 to provide the state of line 481 to this enable input during even numbered states of counter 468.

It will also be appreciated that the output of inverter 478 maintains delay counter 467 in a cleared condition during odd numbered states of counter 468 and that the clear input is removed from delay counter 467 during even numbered states of counter 468. As may also be seen from FIG. 11 the asserted form of the Q1 state bit is provided to line 440 which controls motor 45 of the second preferred embodiment and therefore motor 45 will be active to rotate cartridge 70 during odd numbered states of counter 468 and will not operate during even numbered states.

From inspection of the outputs of decoder 480 it may be seen that only even numbered outputs are brought out on lines 492, 494, and 496 and that these outputs are provided as inputs to the transport and electronics control block 430. It will therefore be appreciated that the transport and record/playback electronics of the second preferred embodiment are operative during even numbered states of counter 468 and inoperative during odd numbered states during which cartridge 70 is being rotated.

With these features in mind the operation of the second preferred embodiment will easily be understood. During the 001 state the apparatus removes the zero position microcassette cassette from engagement with the transport and begins rotation of cartridge 70 until switches 120 and 121 detect the approach of the cassette position corresponding to the particular one of trunks 409 which has been seized. This proceeds as described hereinabove in connection with the first preferred embodiment and upon detection of the approach of the proper cassette position (corresponding to a proper recorded message) a logical one is provided on line 447.

The transition from zero to one on line 447 is provided to positive transition detector 470 which provides a positive going pulse one clock period wide to OR gate 477. This pulse propagates through OR gate 477 enabling state counter to count from 001 to 010.

Rotation of motor 45 will continue until switch S2 opens when the approaching microcassette containing the appropriate prerecorded message is lowered into operative engagement with the transport. The entry into an even state removes the clear input from delay counter 467 thus allowing this counter to begin to count from zero to its final value, depending on the scale of counter 467. The entry into an even numbered state also causes the zero at point 464 to be provided to the K input flip-flop 481 and causes a one to be provided on line 479. Therefore when delay counter 467 has counted to its terminal count providing a logical one to the J input of flip-flop 481, flip-flop 481 will set upon the next positive going clock transition thus enabling decoder 480 through AND gate 485.

It will therefore be appreciated that the scale of delay counter 467 should be selected so that sufficient time is required for delay counter 467 to count from its zero state to its terminal count that will allow cartridge 70 to rotate from the position at which switch S6 was last strobed (indicating the approach of the desired cassette) until the desired cassette is properly lowered into operative position on the transport. Of course delay counter 467 will continue to toggle back to zero and count up to its terminal count but this will not affect the output of flip-flop 481 since a zero is being provided from point 464 to its K input. Thus a predetermined period of time after entry into an even numbered state (in this case the 010 state) a logical one appears on line 492 from the two output of decoder 480 and activates a conventional play function from transport and electronics control block 430. When this occurs the appropriate recorded message on the particular cassette engaged with the transport is played over line 429, is amplified by summing amplifier 486, and provided the outgoing side of telephone hybrid 420.

Therefore it will be appreciated that the combination of three prerecorded messages at positions one through three and the control circuitry of FIG. 11 comprise a plurality of message means for providing an audio output through hybrid 420 to the calling party. Furthermore, when the message means becomes inoperative, an indexing signal from NOR gate 489 and AND gate 490 causes the apparatus to connect the calling party to the cassette at position zero when the message means becomes inoperative as detected by tone detector 487.

In the second preferred embodiment of the present invention a tone of predetermined frequency f1 is recorded at the end of each outgoing message. Prior to provision of the f1 tone each message should terminate by an audible instruction to the caller to leave a message upon the occurrence of an audible tone. It is therefore preferred that the tone of frequency of f1 be inaudible to the calling party.

The presence of the f1 tone on line 429 is detected by f1 tone detector 487 which in the second preferred embodiment is a type 567 tone decoder. As is known to those skilled in the art the type 567 is a phase lock loop tone decoder having a logical output which goes low upon the detection of a tone which falls within the predetermined lock range of the detector. As may be seen from FIG. 11 this output is damped by an RC network designed to damp out spurious locks and when a true lock condition is detected (for a sufficient period of time indicating the presence of a continuous f1 tone) the output is inverted and provided as an input to OR gate 488.

The transition from zero to one of an input to OR gate 488 is provided to transition detector 476 which in turn provides a pulse one clock period wide to OR gate 477 enabling state counter 486 to count to its next state.

It will be apparent to those skilled in the art from inspection of FIG. 11 that no input to OR gate 488 will be maintained in a logical one state that will prevent OR gate 488 from detecting transitions from zero to one on the other inputs.

Therefore the f1 tone at the end of the recorded outgoing message causes state counter 468 to count to its three state (011). This is an odd numbered state motor 45 again comes operative and decoder 480 is disabled. When motor 445 becomes operative it is apparent that the particular message cassette corresponding to the trunk which is presently seized will leave its position of engagement with the transport. During rotation of cartridge 70 the zero position must be reached prior to a second encounter with the particular cassette corresponding to the seized trunk.

As may be seen from FIG. 11 NOR gate 489 detects the approach of the zero cassette position. As explained hereinabove the zero cassette position is designated as holding the microcassette used for recording incoming messages. The detection of the approach of the zero position during either the three (011) or the seven (111) states of counter 468 is detected by AND gate 490 which provides zero to one transition to OR gate 488. As in the previous case this causes counter 468 to count to its next state, four (010).

After the above described delay from delay counter 467 a logical one appears on line 494 from the four output of decoder 480. The logical one on line 494 activates the record function of transport and electronics control block 430 in a conventional manner. The logical one on line 494 is also provided to point 490 which triggers one shot 491 and conditions AND gate 452 to provide a logical one when calling party eventually hangs up.

One shot 491 turns on an oscillator 493 which provides a tone of predetermined frequency f2. f2 should be audible and will therefore signal calling party that the recorder is ready to accept and record an incoming message.

The apparatus will remain in its four state until the calling party hangs up, an event which is conventionally detected by central office idle detector 458. The idle condition of the trunk is detected by AND gate 452 as described hereinabove and the positive transition on the output of this gate is provided to OR gate 488 and thus enables counter 468 to count to its five (101) state.

During the five state of the counter motor 45 will rotate cartridge 70 until the message cassette corresponding to the trunk upon which the call was received is again encountered. When this occurs the outgoing message cassette will again be lowered into operative connection with the transport as described hereinabove during the one state. Recall that the message cassette was left in its played position. When the approach of the particular message cassette is detected by magnitude comparator 435 counter 468 counts to its six (110) state and after the delay from counter 467 the message cassette will be placed on the transport. The six output of decoder 480 goes high providing a logical one on line 496.

The one on line 496 activates the rewind function on transport and electronics control block 430 and also triggers one shot 497. The triggering of one shot 497 causes it to place a logical zero on its inverted output which is provided as an input to AND gate 498. Line 496 is also provided as an input to AND gate 498. Since there is a propagation delay through one shot 497 the output of AND gate is damped by RC network 484 will absorb a momentary glitch which occurs when line 496 makes its zero to one transition.

The remaining input to AND gate 498 is an absence of motion detection signal which appears on line 495 from the transport and electronics control block 430.

The period of one shot 497 should be selected to be long enough to allow mechanical inertia the transport spindle motor (not shown) to be overcome during the rewind operation. Therefore when one shot 497 times out, a logical zero will be provided on line 495 until the message cassette is completely rewound, an event which will cause a logical one to appear at no motion output 495. When the tape is completely rewound, all inputs to AND gate 498 will become one and, after a sufficient time for charging of RC network 484, a zero to one transition will appear at the output of OR gate 488.

Once again a transition at the input of OR gate 488 allows state counter 468 to count, in this instance to its seven count (111).

The seven state, being an odd numbered state, causes motor 45 to become operational and, as described hereinabove NOR gate 489 again detects the approach of the zero position (incoming message recording) cassette and causes a transition to appear at the output of AND gate 490. This transition, as in the previous case when the approach of the zero cassette was detected during the 011 state, causes the counter to count (in this instance it will toggle over to its 00 state). After the delay from delay counter 467 zero output of decoder 480 is provided to line 412, resetting trunk seizure detector 410.

It will therefore be appreciated that at the end of a sequence of operation the apparatus the second preferred embodiment will always leave the zero cassette engaged with the transport, an assumption which was made at the beginning of the description the cycle of operation of the second preferred embodiment.

An embodiment of seizure control apparatus 410 is shown in FIG. 12. As may be seen on FIG. 12, the outputs of ring detectors 415 are provided on lines 416 as the inputs to a latch 510. The outputs of latch 510 are provided as the four lowest order inputs to a priority encoder 515. It will be appreciated by those skilled in the art that priority encoder 515 may be embodied by a type CD-4532B CMOS eight bit priority encoder currently manufactured by RCA which provides a two bit encoded output on lines 417 corresponding to the highest order one of inputs D0–D3 (D3 being highest priority) having a one thereon. The Q3 output and D4–D7 inputs are not used. Therefore the present invention allows telephone lines 409 to be prioritized in the event of simultaneous ringing. Switch 516 is provided to selectively connect the D0 input of encoder 515 to either the lowest priority trunk for the embodiment of FIG. 10 or to ground as would be used in the embodiment of FIG. 11.

The GS output of encoder 515 which appears on line 518 goes high in the event that one of the priority inputs to encoder 515 goes high. The zero to one transition on line 518 is delayed by delay element 520, after which this signal strobes the clock input to flip-flop 521 causing same to set. The setting of flip-flop 521 causes a one to zero transition to appear on line 522 thus strobing latch 510 and latching the states of lines 416 onto the inputs of encoder 515. The Q output from flip-flop 521 triggers positive edge-triggered one shot 526 and also provides a logical one on line 525. The triggering of one shot 526 provides the aforementioned logical one pulse on line 432 which appears at the seize output of seizure control apparatus 410 as shown in FIGS. 10 and 11.

When one shot 526 times out, its negated output goes high causing both inputs to AND gate 530 to be high. This causes a logical one to appear on line 531 which is amplified by driver 532 causing a signal to appear on line 411 which activates relay selector logical and protective circuitry 418.

The delay from one shot 526 may be selectively varied to give sufficient time for a ring back signal to appear to the calling party so that it will not appear that no connection was made.

As noted hereinabove, a logical one on line 412 resets seizure control apparatus 410. As is shown in FIG. 12, line 412 is connected to positive transition detector 536 which provides a logical one pulse one clock period wide on line 438 resetting flip-flop 421 again establishing a logical one on line 522 making latch 510 transparent to the states of lines 416.

It should be understood that transition detector 536 may be identical to detectors 470 and 476 shown on FIG. 11.

It will be appreciated by those skilled in the art that the foregoing description of two preferred embodiments of the present invention have been exemplary and are not to be construed to limit the scope of the present invention. Therefore the scope of the present invention should be limited only by the claims below.

We claim:

1. Audio signal recording apparatus for recording and reproducing audio information from one of a plurality of telephone trunks including connecting means for establishing an audio connecting path between a set of record/playback electronics and one of said plurality of trunks in response to an incoming call on one of said plurality of trunks wherein the improvement comprises:

a record medium transport connected to said record/playback electronics;
   a plurality of discrete recording media;
   control means responsive to said incoming call and said plurality of trunks for providing a first indexing signal corresponding to said one of said plurality of trunks in response to said incoming call;
   indexing means for placing a particular one of said plurality of recording media in operative relationship with said transport in response to said first indexing signal;
   said control means being further responsive to said placing of said particular one of said plurality of record medium in operative relationship with said transport to provide a first control signal to said transport and said record/playback electronics to cause audio information recorded on said particular one of said plurality of discrete recording media to be provided to said audio connecting path;
   said control means being further responsive to a predetermined signal recorded on said particular one of said plurality of discrete recording media to provide a second indexing signal; and
   said indexing means being further responsive to said second indexing signal to place a second particular one of said plurality of discrete record media in operative relationship with said transport.

2. Audio signal recording apparatus for recording and reproducing audio information from one of a plurality of audio links including connecting means for establishing an audio connecting path between a set of record/playback electronics and one of said plurality of audio links in response to a call signal on one of said plurality of audio links wherein the improvement comprises:
- a record medium transport connected to said record/playback electronics;
- a carrier cartridge mounted on a changer apparatus, including a plurality of cassette carrier positions, each for holding a tape cassette;
- said changer apparatus being selectively operable to place each said cassette carrier positions onto said transport thereby placing a discrete cassette carried at said cassette carrier position into operative relationship with said record/playback electronics;
- control means responsive to said call signal and said plurality of audio links for providing a particular one of a plurality of indexing signals corresponding to said one of said plurality of cassette carrier positions in response to said call signal;
- indexing means connected to said changer means for causing said changer apparatus to place a first particular one of said plurality of cassette carrier positions onto said transport in response to said particular one of said indexing signals;
- said control means being further responsive to said indexing means to cause a prerecorded message on a tape cassette carried at said particular cassette carrier position to be reproduced over said one of said plurality of audio links;
- said control means further comprising means connected to said indexing means for detecting an end of message condition and providing a second particular one of said plurality of indexing signals;
- said indexing means being responsive to said second particular indexing signal to cause said changer apparatus to place a second particular one of said plurality of cassette carrier positions onto said transport for recording an incoming message from said one of said plurality of audio links.

3. Audio signal recording apparatus as recited in claim 2 wherein said control means is responsive to said plurality of audio links to provide an end of incoming message detection signals; and
- said indexing means is further responsive to said end of incoming message detection signal to cause said changer apparatus to return said first particular one of said cassette carrier positions to said transport.

4. Audio signal recording apparatus as recited in claim 3 wherein:
- said indexing means is further responsive to said first particular cassette carrier position being returned to said transport to provide a tape rewind signal to said transport.

5. Audio signal recording apparatus as recited in claim 2 wherein said indexing means comprises a state counter.

* * * * *